United States Patent [19]

Nakahara et al.

[11] 3,781,687

[45] Dec. 25, 1973

[54] WIRELESS COMMUNICATION SYSTEM FOR RAILWAY VEHICLE INCLUDING AN OPEN TYPE TRANSMISSION LINE MOUNTED ON A RADIOWAVE ABSORBENT SUPPORT

[75] Inventors: Tsuneo Nakahara; Noritaka Kurauchi; Hiroshi Kitani; Kenji Takemura; Masataka Kuroda, all of Osaka, Japan

[73] Assignee: Sumitomo Electric Industries, Limited, Osaka, Japan

[22] Filed: Dec. 28, 1970

[21] Appl. No.: 101,669

[30] Foreign Application Priority Data

Dec. 28, 1969 Japan .................................. 45/845

[52] U.S. Cl. ......................... 325/52, 325/51, 246/8, 246/30, 343/713, 343/717, 343/873, 343/878, 343/905

[51] Int. Cl. .............................................. H04b 1/10

[58] Field of Search .................... 246/8, 30; 325/51, 325/52; 343/18 A, 711, 713, 715, 717, 718, 873, 878, 888, 905; 340/47, 48

[56] References Cited

UNITED STATES PATENTS

| | | | |
|---|---|---|---|
| 3,659,094 | 4/1972 | Nakahara | 325/51 |
| 3,590,383 | 6/1971 | Nakahara | 343/713 |
| 3,526,896 | 9/1970 | Wesch | 343/18 A |

*Primary Examiner*—Albert J. Mayer
*Attorney*—Sughrue, Rothwell, Mion, Zinn and Macpeak

[57] ABSTRACT

A communication system for eliminating interference in communications between a fixed station and a mobile vehicle. The fixed station includes a support base for supporting an open type transmission line, along the path of the mobile vehicle. The transmission line transmits radio waves from the fixed station and receives radio waves from the mobile vehicle. The mobile vehicle includes an antenna positioned to transmit radio waves from said mobile vehicle and to receive radio waves from the fixed station. The support base is positioned relative to the transmission line and the antenna, such that radio waves from the antenna not received by the transmission line and radio waves from the transmission line not received by the antenna and radio waves from other communication systems, are absorbed by the support base. The system may also include wave absorbing means positioned on the mobile vehicle to further reduce interference.

6 Claims, 10 Drawing Figures

INVENTORS
TSUNEO NAKAHARA
NORITAKA KURAUCHI
HIROSHI KITANI
KENJI TAKEMURA
MASATAKA KURODA
BY Sughrue, Rothwell, Mion,
Zinn & Macpeak
ATTORNEYS

WIRELESS COMMUNICATION SYSTEM FOR RAILWAY VEHICLE INCLUDING AN OPEN TYPE TRANSMISSION LINE MOUNTED ON A RADIOWAVE ABSORBENT SUPPORT

BACKGROUND OF THE INVENTION

1. Field of the Invention

The present invention relates to an improvement in wireless communication systems for use in a railway vehicle in which interference to the waves between a mobile station in the railway vehicle and a ground station is substantially reduced.

2. Description of the Prior Art

According to one exemplary type of prior art transportation wireless communication system it is well known that a ground transmission line can be installed along the path of a railway vehicle for uniform diffusion of the leakage waves. The waves are received by an antenna mounted in the railway vehicle. In this type of system, communication takes place between the ground station and the mobile station of the railway vehicle during the travel of the latter along the ground transmission line.

In these systems, problems have arisen when communication between the ground station and the mobile station is disturbed by external radio waves emitted from commercial communication facilities or when the radio waves used in communication therebetween disturb the communication between commercial communication facilities.

SUMMARY OF THE INVENTION

Therefore, the primary object of the present invention is to sufficiently reduce the interference of radio waves between an ordinary communication system and a ground-to-train communication system.

DESCRIPTION OF THE PREFERRED EMBODIMENTS

Figure 1:
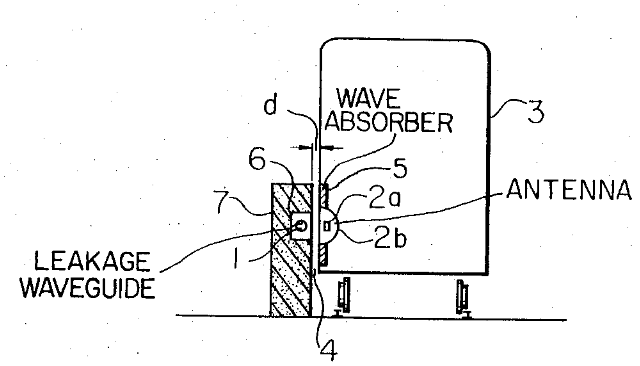
FIG. 1 is a front view of a railway vehicle in which a wireless communication system of the present invention is embodied.
Figure 5:
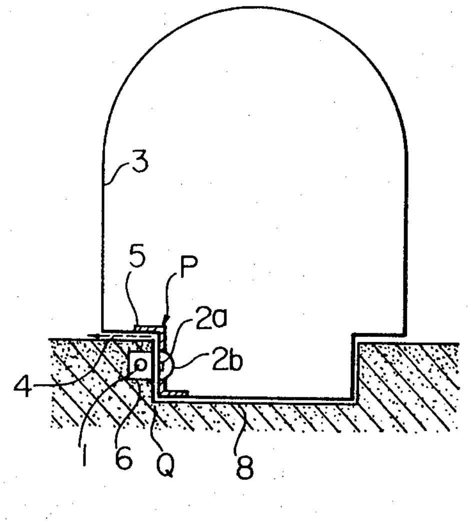
FIG. 5 is a front view of a railway vehicle in which a modified wireless communication system of the present invention is embodied.

In order to reduce interference of radio waves between an ordinary communication system and a ground-to-train system, two different means are respectively incorporated in one embodiment as shown in FIG. 1 and a modified embodiment as shown in FIG. 5 of the present invention.

First in connection with the embodiment incorporating one of said means, the present invention will be hereinafter fully described with reference to FIG. 1 through FIG. 4.

Referring particularly to FIG. 1, 1 is a leakage waveguide. 2*a* and 2*b* are antennas mounted in a mobile body, for example, a train 3. 4 is a gap formed between the train 3 and a support structure 7 for supporting said leakage waveguide 1. 5 is a wave absorber provided in the train at a position adjacent and along the gap 4, and 6 is a conduit accommodating said leakage waveguide 1.

Communication between the ground station and the mobile station in the train 3 can be carried out by radio wave connection between the leakage waveguide 1 and the train antennas 2*a* and 2*b*. However, leakage of a portion of the radio waves through the gap 4 will result in noise interference to an external communication system other than the ground-to-train communication system.

According to the present invention, such noise interference to an external communication system is substantially reduced. An experiment has been conducted to determine to what extent the leaked waves through the gap 4 will attenuate at the gap 4 as a function of the material used for the support structure 7 and the wave absorber 5. A simulator device employed in the experiment is illustrated in FIG. 2 in a schematic perspective view.

Figure 2:
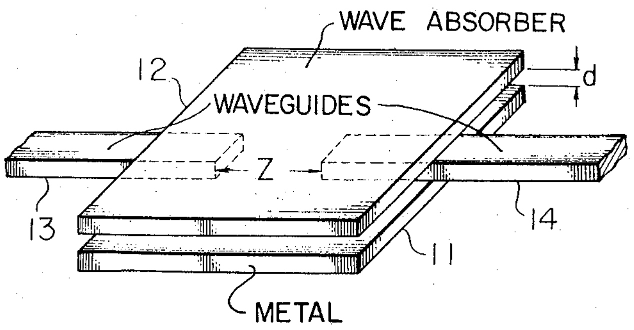
FIG. 2 is a perspective view of a simulator device for testing the performance characteristics of the wireless communication system shown in FIG. 1, FIG. 3 and FIG. 4 are graphs respectively showing the results obtained by the simulator device shown in FIG. 2.

Referring now to FIG. 2, 11 is a metal sheet and 12 is a wave absorbing sheet of the same shape and size as that of metal sheet 11. 13 is a rectangular waveguide serving as wave radiator, and 14 is a rectangular waveguide serving as wave receiver antenna of the same size as that of said waveguide 13.

In the simulator device according to the present invention, a pair of the rectangular waveguides are axially aligned to each other with a spacing Z therebetween. The waveguides are sandwiched between a metal sheet 11 and the wave absorbing sheet 12.

Figure 3:
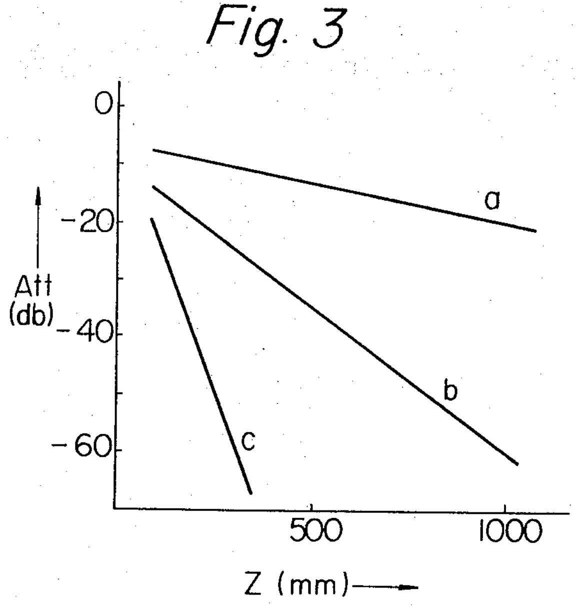
Figure 4:
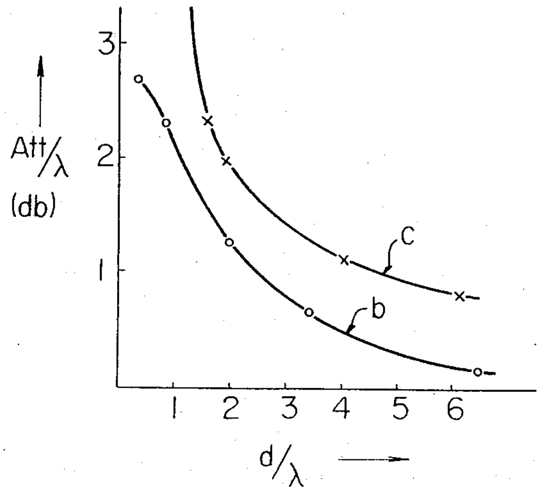

The results of the experiment are illustrated in FIG. 3 and FIG. 4, both of which show the magnitude of wave connection between the waveguides 13 and 14 in the simulator device shown in FIG. 2. In the experiment each of the waveguides had a cross-sectional area of $16 \times 34$ mm$^2$ and radio waves of 7.5 GHz were applied.

In connection with the results of the experiments shown in FIG. 3, the value of the spacing *d* was fixed at 20 mm. throughout the experiment while different materials for the wave absorbing sheet 12 were used in combination with the metal sheet 11. The materials employed were (a) a metal sheet or (b) a porous synthetic resin of styrene mixed with carbon, or (c) a concrete slab. The value of the spacing Z was changed. The magnitude of attenuation of radio waves transmitted from the waveguide 13 to the waveguide 14 according to the above-mentioned material for the absorbing sheet 12 is indicated by *a*, *b*, and *c* in FIG. 3.

In connection with the results of the experiment shown in FIG. 4, the value of the spacing *d* was changed while the value of the spacing Z was fixed. The material for the wave absorbing sheet 12 was (b) a wave absorbing material and (c) a concrete slab.

The results of the experiment are summarized as follows:

In the experiment with the results as shown in FIG. 3, a concrete slab for the wave absorbing material yielded an intensive wave absorption which was greater than that of the conventional wave absorbing material consisting of porous polystyrene resin mixed with cards. The reason appears to be that the concrete has a relatively higher rate of permittivity and waves passing between the concrete slab and the metal sheet form a surface wave mode inside and outside the concrete. Therefore, waves transmitted through the concrete are absorbed by the concrete itself because of its higher rate of dielectric attenuation.

In FIG. 4, the transverse axis indicates the ratio of the spacing $d$ with the respect to the wavelength $\lambda$, and the vertical axis indicates the ratio of the magnitude of attenuation with respect to the wavelength $\lambda$. The curve $b$ in FIG. 4 indicates the magnitude of attenuation when the simulator device was employed with concrete slab in combination with the metal sheet 11 while the spacing Z is fixed and the spacing $d$ was changed. This curve $b$ shows that the magnitude of attenuation increases as a value of the spacing $d$ with respect to the wavelength decreases.

According to the experiment, the magnitude of the attenuation was 15db when the spacing Z was 1,000 mm, the wave length was 40 mm and the spacing $d$ was 3 $\lambda$. However, in practice, since it is desirable that the magnitude of attenuation should be more than 10 db, the spacing $d$ should be not more than 4 $\lambda$. Moreover, in the case where the wave absorbing sheet 12 is concrete, even if the spacing $d$ is large, an intensive magnitude of attenuation can be obtained and, therefore, the concrete has excellent wave absorption.

Another embodiment of the invention is shown in FIG. 5, 1 is a leakage waveguide and 2$a$ and 2$b$ are antennas mounted in a train 3. 4 is a gap between the train 3 and a support base 8, 5 is a wave absorbing member and 6 is a conduit for accommodating the waveguide. P and Q are respective bent portions of the support base 8.

In the ground-to-train communication system shown in FIG. 5, it has been found that the bent portions P and Q of the support base 8 contribute to the wave attenuation. Wireless communications between the ground station and the mobile station take place when wave connection takes place between the leakage waveguide 1 and the train antennas 2$a$ and 2$b$. However, when a portion of radio waves passing therebetween is leaked, an external communication system other than the ground-to-train communication system will be interferred with.

Figure 6:
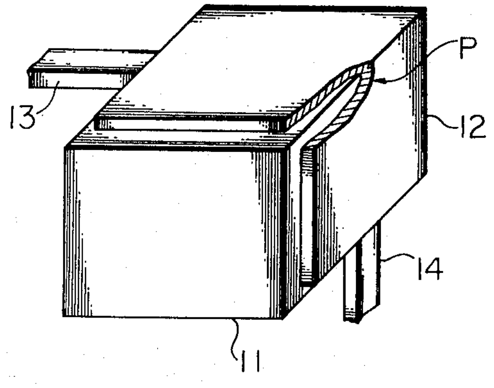
FIG. 6 is a perspective view of a simulator device for testing the performance characteristics the wireless communication system shown in FIG. 5.
Figure 7:
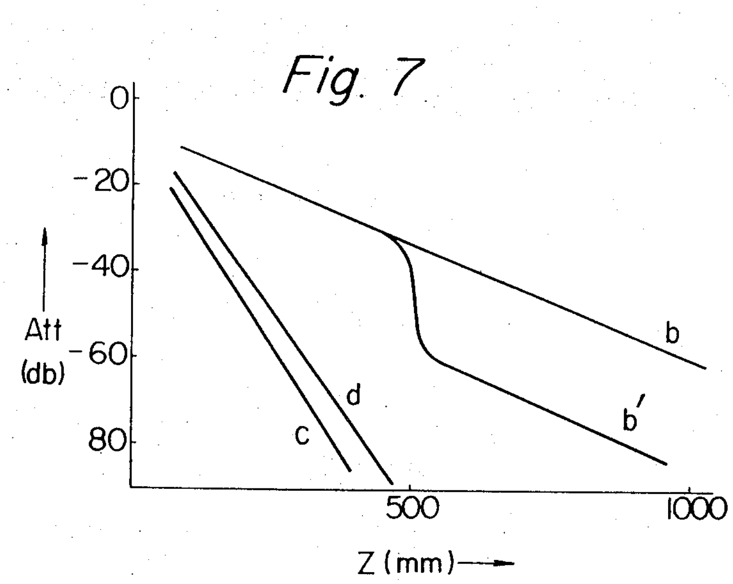
FIG. 7 is a graph showing the results obtained by the simulator device shown in FIG. 6.

A simulator device for testing the performance characteristics of the mobile communication system as shown in FIG. 5 is illustrated in FIG. 6. 11 is a metallic member and 12 is a wave absorbing member. 13 is a waveguide for transmitting radio waves and 14 is a waveguide for receiving the radio waves transmitted by the waveguide 13. P is a curved corner. The principal conditions of the experiment are the same as those with the simulator of FIG. 2. The results of the experiment conducted with the use of the simulator device shown in FIG. 6 are shown in FIG. 7. The transverse axis represents the distance between the opposed open-ends of the waveguides 13 and 14 while the vertical axis represents the magnitude of attenuation of waves transmitted therebetween, said magnitude being represented in db. For comparison, the,line $b$ in FIG. 3 is drawn in the graph shown in FIG. 7.

As shown in FIG. 6, when the bent corner P serves as a wave absorbing line and the value of the distance Z is constant, the waves will attenuate at a position corresponding to the bent corner by 20 db as shown by the curve $b'$ in FIG. 7.

In the case where the simulator device shown in FIG. 6 is provided with a metal sheet for 11 and 12 and a wave absorbing member along the edge of the bent corner P of the wave absorbing line, it can be understood from the curve C in FIG. 7 that the magnitude of attenuation will increase as the distance Z increases.

However, in the case where the simulator device is provided with a metal sheet for 11 and a wave absorbing material for 12, the results of the experiment are illustrated by the curve $d$ in FIG. 7. It will be clearly understood that provision of the wave absorbing material at the bent corner yields a substantial effect on attenuation.

Figure 8:
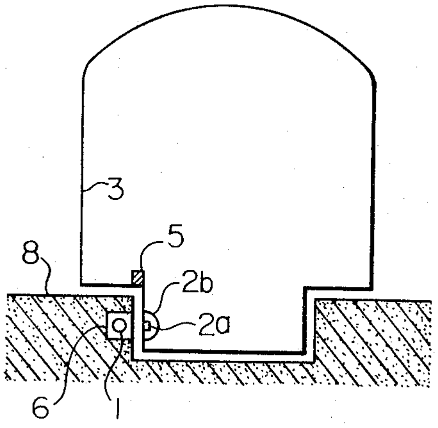
FIG. 8 is a front view of a railway vehicle in which a further modified wireless communication system of the present invention is embodied.

FIG. 8 is a further modified embodiment of the ground-to-train wireless communication system in accordance with the present invention. The wave absorbing member 5 is arranged at the bent corner with the reference numerals being designated by the like parts shown in FIG. 5. The embodiment of FIG. 8 produces substantial wave attenuation as proved from the experiment conducted with the use of the simulator device shown in FIG. 6.

Figure 9:
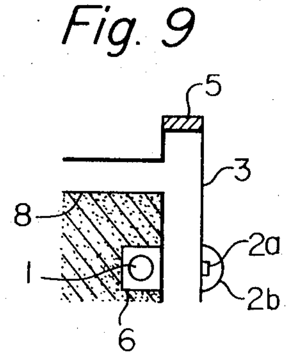
FIG. 9 and FIG. 10 are illustrative views, on an enlarged scale, of a lower corner structure of the railway vehicle shown in FIG. 8 in which the present invention is embodied.
Figure 10:
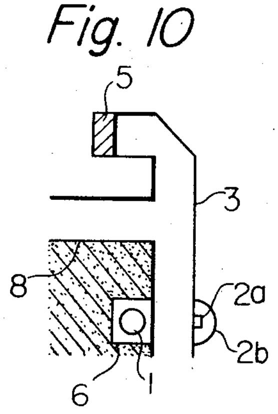

Various arrangements of the wave absorbing member about the bent portion are illustrated in FIG. 9 and FIG. 10. A cut-out portion is provided in a framework of the train for accommodating the wave absorbing member apart from the bent portion. Therefore, these arrangements are advantageous for protecting the wave absorbing member.

As hereinbefore fully disclosed, the present invention offers many advantages by the employment of concrete for the wave absorbing member of the wave absorbing line and the provision of a bent portion in the wave absorbing line. These features will substantially reduce the noise interference to an external communication system and good communication can be obtained between the ground station and the mobile station.

Although the present invention has been described in connection with application of a leakage waveguide, an open type transmission line such as leakage coaxial cable or the like may be of course employed without reduction of the results thus obtained.

While the invention has been particularly shown and described with reference to the preferred embodiment thereof, it will be understood by those skilled in the art that various changes in form and details may be made therein without departing from the spirit and scope of the invention.

We calim:

1. A wireless communication system for use with a mobile vehicle and a fixed station comprising:

a. a radio wave absorbing support means comprising a concrete base positioned along the path of travel of said vehicle;

b. an open type of transmission line means mounted on said support means for transmitting radio waves from said fixed station and for receiving radio waves from said mobile vehicle; and c. antenna means mounted on said mobile vehicle for transmitting radio waves from said mobile vehicle and for receiving radio waves from said fixed station wherein said support means absorbs electromagnetic energy radiated by said transmission line means and not incident upon said antenna and electromagnetic energy radiated by said antenna and not incident upon said transmission line means.

2. A wireless communication system for use with a mobile vehicle and a fixed station comprising:

a. a radio wave absorbing support means comprising a concrete base positioned along the path of travel of said vehicle;

b. an open type of transmission line means mounted on said support means for transmitting radio waves from said fixed station and for receiving radio waves from said mobile vehicle;

c. antenna means mounted on said mobile vehicle for transmitting radio waves from said mobile vehicle and for receiving radio waves from said fixed station wherein said support means absorbs electromagnetic energy radiated by said transmission line means and not incident upon said antenna and electromagnetic energy radiated by said antenna and not incident upon said transmission line means;

d. said support means comprising a base having a first outer surface and a second outer surface, said first outer surface being perpendicular to said second outer surface wherein said transmission line means is positioned below said first outer surface;

e. said mobile vehicle including a third surface and a fourth surface wherein said third surface is parallel to said first outer surface and said fourth surface is parallel to said second outer surface; and f. said mobile vehicle further including wave absorbing means.

3. The system of claim 2 wherein said wave absorbing means are positioned on said third and fourth surfaces of said mobile vehicle.

4. The system of claim 2 wherein said wave absorbing means is positioned on said third surface of said mobile vehicle.

5. The system of claim 2 wherein said mobile vehicle includes a fifth surface means positioned parallel to and above said third surface and wherein said wave absorbing means is positioned on said fifth surface means.

6. The system of claim 2 wherein said mobile vehicle includes a sixth surface means parallel to said fourth surface and wherein said wave absorbing means is positioned on said sixth surface means.

* * * * *